(12) United States Patent
Koo et al.

(10) Patent No.: US 12,444,065 B2
(45) Date of Patent: Oct. 14, 2025

(54) APPARATUS, METHOD AND COMPUTER READABLE STORAGE MEDIUM FOR MEASURING DEPTH OF TREAD GROOVE

(71) Applicants: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

(72) Inventors: Jung Mo Koo, Seoul (KR); Kyoung Soo We, Osan-si (KR); Hye Yeon Lee, Ansan-si (KR); Gwang Jin Kim, Ansan-si (KR); Hyung Il Koo, Suwon-si (KR)

(73) Assignees: HYUNDAI MOTOR COMPANY, Seoul (KR); KIA CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 380 days.

(21) Appl. No.: 18/093,887

(22) Filed: Jan. 6, 2023

(65) Prior Publication Data

US 2024/0104756 A1 Mar. 28, 2024

(30) Foreign Application Priority Data

Sep. 22, 2022 (KR) .................. 10-2022-0120306

(51) Int. Cl.
*G06K 9/00* (2022.01)
*G06T 7/13* (2017.01)
(Continued)

(52) U.S. Cl.
CPC .............. *G06T 7/529* (2017.01); *G06T 7/13* (2017.01); *G06T 7/246* (2017.01); *G06T 7/277* (2017.01);
(Continued)

(58) Field of Classification Search
CPC ........... G06T 7/529; G06T 7/13; G06T 7/246; G06T 7/277; G06T 7/60;
(Continued)

(56) References Cited

U.S. PATENT DOCUMENTS

| 5,895,845 | A | 4/1999 | Bürger | |
| 9,805,697 | B1 * | 10/2017 | Dorrance | .............. B60C 99/006 |

(Continued)

FOREIGN PATENT DOCUMENTS

| JP | 2020165895 A | * 10/2020 | ........... B60C 11/246 |
| KR | 10-1997-0705005 A | 9/1997 | |

(Continued)

*Primary Examiner* — Shervin K Nakhjavan
(74) *Attorney, Agent, or Firm* — Morgan, Lewis & Bockius LLP

(57) ABSTRACT

An apparatus for measuring a depth of a tread groove may include: a camera module capturing a video including an upper end portion of a tire while rotating around an upper end portion of the tire having a plurality of tread grooves, the video including a plurality of frames; a control module obtaining, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire; and a conversion module converting the depth of the tread groove in units of pixels into the depth in physical units.

20 Claims, 15 Drawing Sheets

(51) Int. Cl.
  *G06T 7/246*    (2017.01)
  *G06T 7/277*    (2017.01)
  *G06T 7/529*    (2017.01)
  *G06T 7/60*     (2017.01)
(52) U.S. Cl.
  CPC ...... *G06T 7/60* (2013.01); *G06T 2207/10016* (2013.01)
(58) Field of Classification Search
  CPC .......... G06T 2207/10016; G01B 11/22; G01B 11/022; G01B 11/028; G06F 17/10; G08B 21/182
  See application file for complete search history.

(56) References Cited

U.S. PATENT DOCUMENTS

| | | | |
|---|---|---|---|
| 11,562,472 B2* | 1/2023 | Grossman | G01M 17/027 |
| 12,188,845 B1* | 1/2025 | Voeller | H04N 9/646 |
| 2015/0330773 A1* | 11/2015 | Uffenkamp | G01B 11/25 |
| | | | 356/631 |
| 2018/0299352 A1* | 10/2018 | Rose | G06T 7/0002 |
| 2022/0099530 A1* | 3/2022 | Honda | B60C 11/246 |

FOREIGN PATENT DOCUMENTS

| | | | | |
|---|---|---|---|---|
| KR | 10-2019-0062057 A | 6/2019 | | |
| KR | 10-2079862 B1 | 2/2020 | | |
| WO | WO-2023074867 A1 * | 5/2023 | ............ | G01B 11/25 |

* cited by examiner

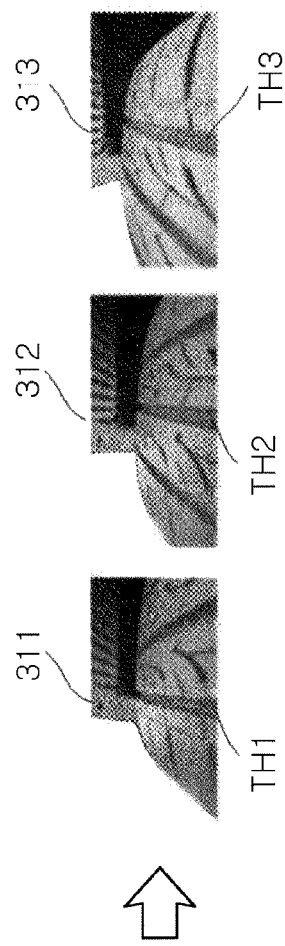
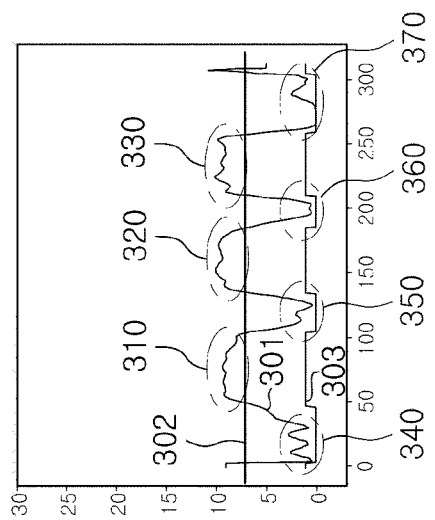
FIG. 3A
FIG. 3B

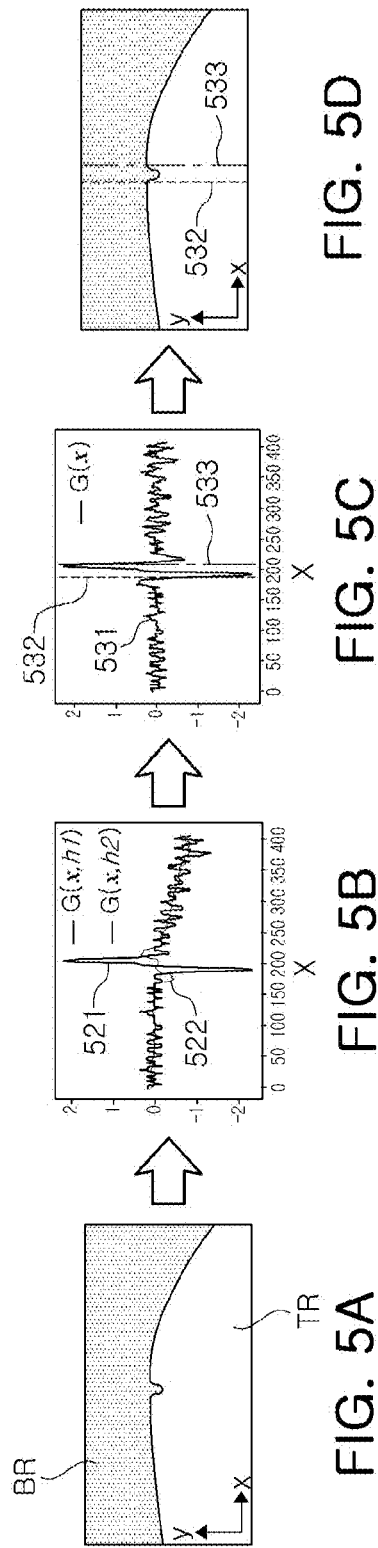

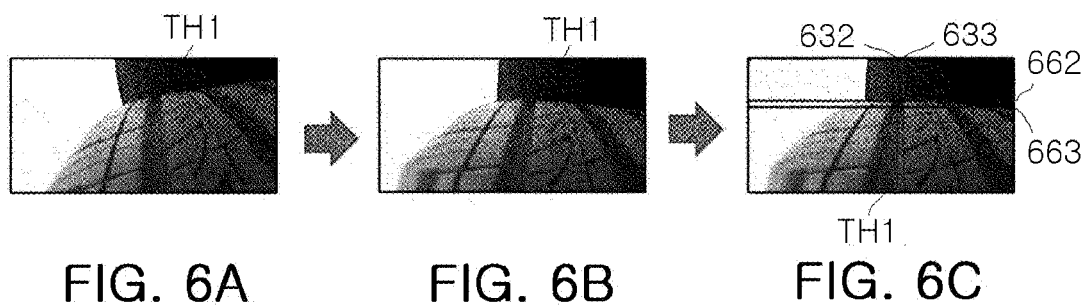

APPARATUS, METHOD AND COMPUTER READABLE STORAGE MEDIUM FOR MEASURING DEPTH OF TREAD GROOVE

CROSS-REFERENCE TO RELATED APPLICATION(S)

This application claims benefit of priority to Korean Patent Application No. 10-2022-0120306 filed on Sep. 22, 2022 in the Korean Intellectual Property Office, the disclosure of which is incorporated herein by reference in its entirety.

BACKGROUND

1. Technical Field

The present disclosure relates to an apparatus, method, and computer-readable storage medium for measuring a depth of a tread groove.

2. Description of Related Art

In general, a tread of a tire is deeply grooved to improve braking and driving force. The groove is referred to as a "tread groove." That is, when there is no pattern on the tread of the tire, since a lot of slippage occurs and danger arises, the tread groove is formed to help safe driving.

As a vehicle runs, the tread of the tire wears out, so the depth of the tread groove formed on the tread becomes shallower. When this process is repeated, eventually, the tread becomes bald, so that braking force is reduced, thereby threatening the safety of vehicle passengers.

Conventionally, a driver directly measures a depth of a tread groove. When the depth becomes shallow, there is a need to replace a tire. To this end, tire manufacturers mark a triangle on side walls of a tire. When following a triangle in a direction perpendicular to a circumference of a tire, there is a protrusion in part of the tread groove. A driver may determine that it is time to replace the tire when a height of the protrusion becomes the same as the tread height without the tread groove.

As such, in the related art, in order to determine how much the tread of the tire is worn out, there is an inconvenience in that a driver has to directly check the tread groove with the naked eye.

SUMMARY

According to an exemplary embodiment of the present disclosure, after a cross-sectional width of a tire in units of pixels is obtained based on a video captured using a camera of a mobile phone, a depth of the tread groove in units of pixels may be converted into a depth in physical units based on a ratio of a cross-sectional width of the obtained tire image in units of pixels and a cross-sectional width marked on a sidewall of the tire in physical units, thereby simply measuring the depth of the tread groove without a separate measuring device.

In addition, according to the exemplary embodiment of the present disclosure, by estimating a moving speed of an edge using the Kalman filter, it is possible to robustly measure a width of an inner block in spite of noise such as a change in a capturing speed, hand-shake, and the like that may occur during capturing of a video.

According to an aspect of the present disclosure, an apparatus for measuring a depth of a tread groove may include: a camera module capturing a video including an upper end portion of a tire while rotating around the upper end portion of the tire having a plurality of tread grooves disposed in an outer circumferential surface of the tire, the video including a plurality of frames; a control module obtaining, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and a conversion module converting the depth of the tread groove in units of pixels into the depth in physical units based on a ratio of the cross-sectional width of the tire in units of pixels and the cross-sectional width of the tire in the physical units.

According to another aspect of the present disclosure, a method of measuring a depth of a tread groove may include: capturing, by a camera module, a video including an upper end portion of a tire while rotating around the upper end portion of the tire having a plurality of tread grooves disposed in an outer circumferential surface of the tire, the video including a plurality of frames; obtaining, by a control module, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and converting, by a conversion module, the depth of the tread groove in units of pixels into the depth in physical units based on a ratio of the cross-sectional width of the tire in units of pixels and the cross-sectional width of the tire in the physical units.

According to another aspect of the present disclosure, there is provided a computer-readable storage medium having a program comprising instructions that cause a computer to: capture a video including an upper end portion of a tire while rotating around the upper end portion of the tire having a plurality of tread grooves disposed in an outer circumferential surface of the tire, the video including a plurality of frames; obtain, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and convert the depth of the tread groove in units of pixels into the depth in physical units based on a ratio of the cross-sectional width of the tire in units of pixels and the cross-sectional width of the tire in the physical units.

BRIEF DESCRIPTION OF DRAWINGS

The above and other aspects, features, and advantages of the present disclosure will be more clearly understood from the following detailed description taken in conjunction with the accompanying drawings, in which:

FIGS. 3A and 3B are diagrams illustrating grouping of a plurality of frames according to an exemplary embodiment of the present disclosure, and in particular, are diagrams illustrating first representative frames for each tread groove;

FIGS. 5A to 5D are diagrams illustrating a process of obtaining a left edge and a right edge of a tread groove according to an exemplary embodiment of the present disclosure;

FIGS. 6A to 6C are diagrams illustrating a process of obtaining a width and a depth of the tread groove in units of pixels after rotating a second representative frame according to an exemplary embodiment of the present disclosure;

DETAILED DESCRIPTION

Figure 1:
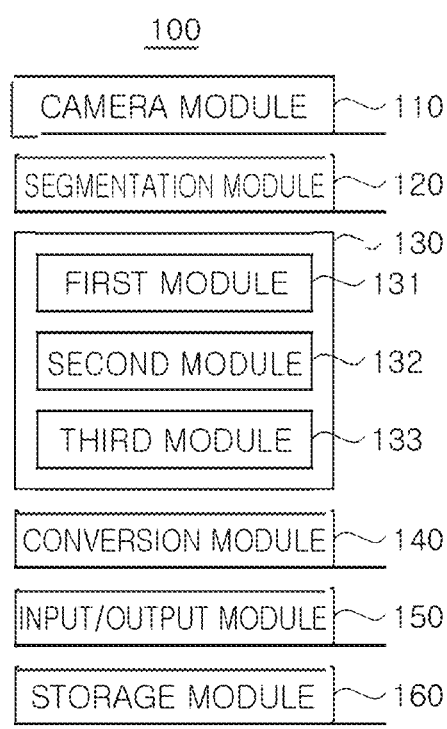
FIG. 1 is a block diagram of an apparatus for measuring a depth of a tread groove according to an exemplary embodiment of the present disclosure.

Hereinafter, exemplary embodiments of the present disclosure will be described in detail with reference to the accompanying drawings. However, example exemplary embodiments may be modified in various other forms, and the scope of the present disclosure is not limited to example exemplary embodiments to be described below. In the drawings, shapes and dimensions of elements may be exaggerated for clarity, and the same components are denoted by the same reference numerals.

FIG. 1 is a block diagram of an apparatus 100 for measuring a depth of a tread groove according to an exemplary embodiment of the present disclosure. The apparatus 100 for measuring a depth of a tread groove includes a camera module 110, a segmentation module 120, a control module 130, a conversion module 140, an input/output module 150, and a storage module 160, and the above-described control module 130 may include a first module 131, a second module 132, and a third module 133.

Hereinafter, the apparatus 100 for measuring a tread groove will be described in detail with reference to FIG. 1.

First, the camera module 110 may capture a video including an upper end portion of a tire while rotating around the upper end portion of the tire having a plurality of tread grooves formed in the outer circumferential surface thereof. The camera module 110 may be a camera module included in a mobile device, such as a smartphone, or a camera module included in a capturing-only device capable of capturing a video, such as a digital camera.

Figure 2:
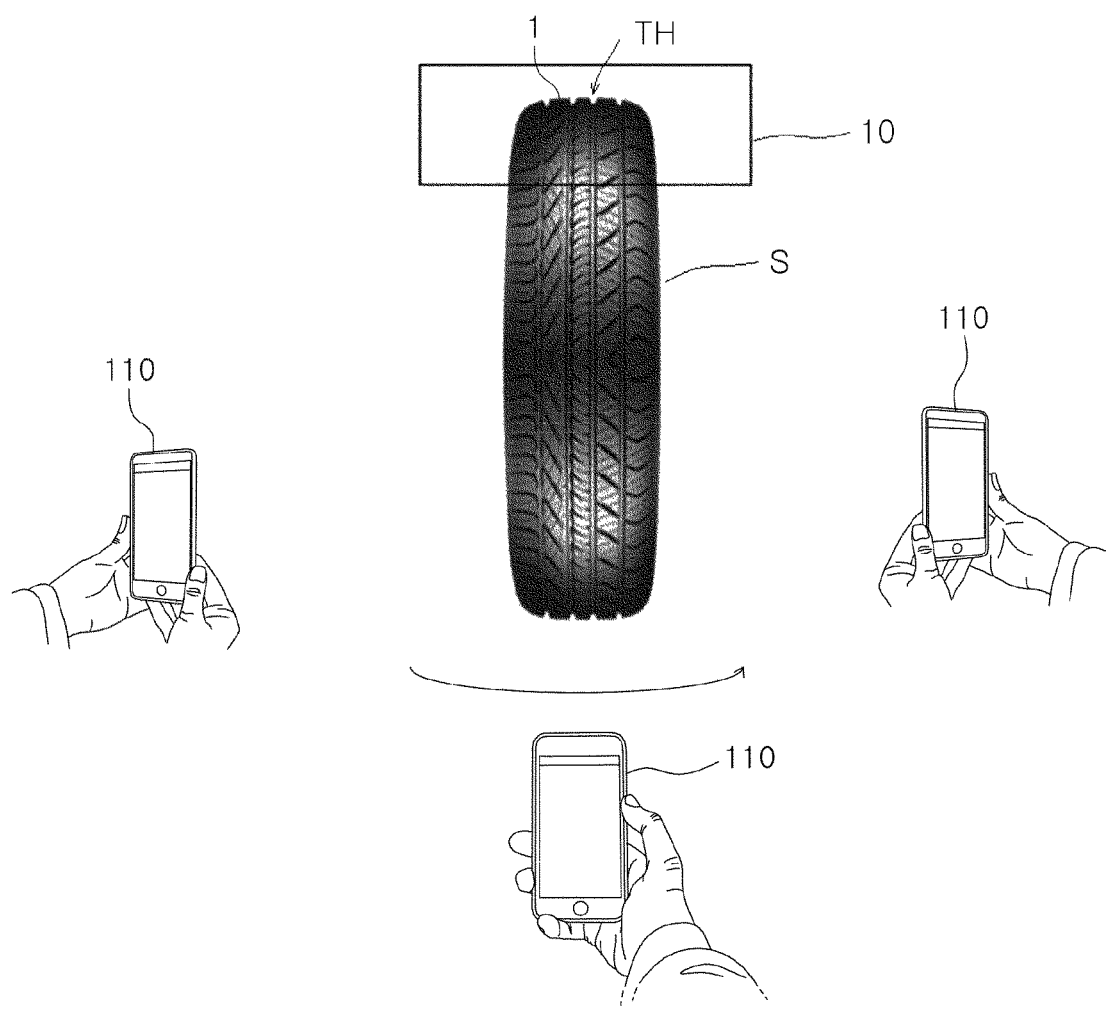
FIG. 2 is a diagram illustrating capturing a video of a tire while rotating around an upper end portion of a tire according to an exemplary embodiment of the present disclosure.

FIG. 2 is a diagram illustrating capturing a video of a tire while the camera module 110 rotates from left to right around the upper end portion of the tire according to an exemplary embodiment of the present disclosure.

That is, as illustrated in FIG. 2, the camera module 110 may capture a video for a region 10 including an upper end portion 1 of a tire S while rotating around the upper end portion 1 of the tire S having a plurality of tread grooves TH formed on the outer circumferential surface thereof. When capturing video, close-up video capturing is performed so that the tread groove TH of the upper end portion 1 of the tire S is visible. Although four tread grooves are illustrated in FIG. 2, it is assumed that the number of tread grooves TH described above is three for the sake of simplicity of the disclosure. Also, although the tire S not mounted on a vehicle is illustrated in FIG. 2, the tire S may be mounted on the vehicle.

The above-described video may include a plurality of frames. The plurality of frames described above may alternately include a first group including frames in which a tread groove having a depth of a tread groove less than a preset threshold value is not visible and a second group including frames in which a tread groove having a groove depth of a tread equal to or greater than the preset threshold value is visible. Hereinafter, the first group and the second group will be described.

FIGS. 3A and 3B illustrate grouping of a plurality of frames according to an exemplary embodiment of the present disclosure, and in particular, are diagrams illustrating first representative frames for each tread groove TH1, TH2, and TH3. In FIG. 3A, an X axis represents a frame number and a Y axis represents a depth of a tread groove, and FIG. 3B illustrates first representative frames 311, 312, and 313 for each of the three tread grooves TH1, TH2, and TH3.

That is, as illustrated in FIG. 3A, a plurality of frames may alternately include first groups 340, 350, 360, and 370 in which a tread groove is not visible including frames in which a depth 301 of a tread groove is less than a preset threshold value 302 and second groups 310, 320, and 330 in which a tread groove is visible including frames in which the depth 301 of the tread groove is equal to or greater than the preset threshold value 302. Non-explained reference numeral 303 denotes a value obtained by converting a comparison result between the depth 301 of the tread groove and the preset threshold value 302 into digital values of 1 and 0.

In FIG. 3A, the $1^{st}$ second group 310 is a group including the frames in which the depth 301 of the first tread groove TH1 is equal to or greater than the preset threshold value 302, the $2^{nd}$ second group 320 is a group including the frames in which the depth 301 of the second tread groove TH2 is equal to or greater than the preset threshold value 302, and the $3^{rd}$ second group 330 is a group including the frames in which the depth 301 of the third tread groove TH3 is equal to or greater than the preset threshold value 302.

The first representative frame 311 for obtaining the width and depth of the first tread groove TH1 may be extracted from the 1$^{st}$ second group 310, the first representative frame 312 for obtaining the width and depth of the second tread groove TH2 may be extracted from the 2$^{nd}$ second group 320, and the first representative frame 313 for obtaining the width and depth of the 3$^{rd}$ tread groove TH3 may be extracted from the third second group 330.

The above-described first representative frames 311, 312, and 313 are frames having the largest width of the tread groove among the frames included in each of the second groups 310, 320, and 330, and the first representative frames 311, 312, and 313 is equal to the number of the plurality of tread grooves TH1, TH2, and TH3.

Meanwhile, the second representative frame may be one of the frames included in the first group between two adjacent second groups.

For example, the second representative frame may be one of the frames included in the first group 350 between two adjacent second groups 310 and 320, or be one of the frames included in the first group 360 between two adjacent second groups 320 and 330. The second representative frame may be a frame having the shallowest depth of the tread groove among the frames included in the first group 350 or the frames included in the first group 360, and thus, may be a middle frame among the frames included in the first group 350 or a middle frame among the frames included in the first group 360.

As described above, the second representative frame among the frames included in the first group 350 and the second representative frame among the frames included in the first group 360 may be used to obtain a width of an inner block in units of pixels, and a process of obtaining the width of the inner block in units of pixels from the second representative frame will be described later with reference to FIG. 7.

Also, the third representative frame may comprises the first representative frame among the frames included in the 1$^{st}$ second group 310 and the first representative frame among the frames included in the last second group 330.

The above-described third representative frame may be used to obtain a width of an outer block in units of pixels, as will be described later. The process of obtaining the width of the outer block in units of pixels from the third representative frame will be described later with reference to FIGS. 8A to 8D.

Meanwhile, the segmentation module 120 may predict tire regions for each of the frames using semantic segmentation. The above-described semantic segmentation is a technique of predicting areas for each object, well-known technique, and a detailed description thereof will be omitted in the present disclosure.

Figure 4A:
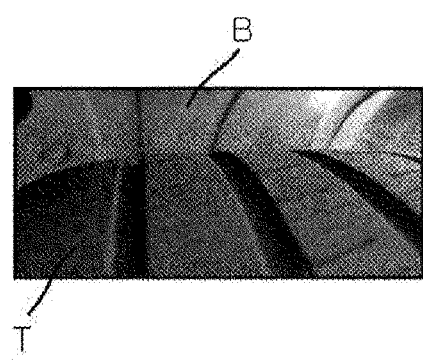
FIGS. 4A and 4B are diagrams illustrating a tire region estimated using semantic segmentation.
Figure 4B:
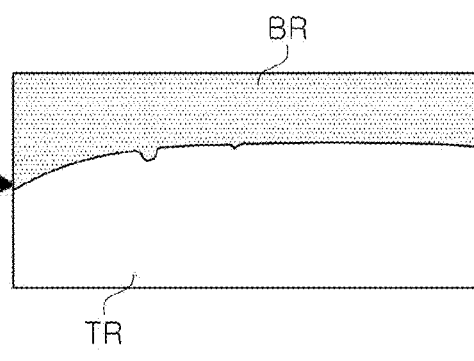

FIGS. 4A and 4B are diagrams illustrating a tire region and a background region estimated using the semantic segmentation.

That is, as illustrated in FIGS. 4A and 4B, the segmentation module 120 may generate a segmented image (see FIG. 4B) that predicts a tire region TR and a background region BR for a frame (see FIG. 4A) including a tire T and a background B, and the segmented image generated for each of the frames may be stored in a storage module 160 to be described later. Thereafter, the control module 130 to be described later may divide the tire region and the background region in each frame with reference to the storage module 160.

Meanwhile, the control module 130 may obtain, based on a plurality of frames, a cross-sectional width of the tire in units of pixels by adding the widths of each of the plurality of tread grooves in units of pixels, the width of the inner block in units of pixels, and the width of the outer block in units of pixels that are formed on the tire. Here, the inner block may mean a tire region between two tread grooves in the frame, and the outer block may mean a tire region including a tread groove on only one side of the frame.

FIGS. 10A to 10G are diagrams illustrating the widths of each tread groove, TH1, TH2, and TH3, the inner block, IB1 and IB2, and the outer block, OB1 and OB2, of the tire in units of pixels, respectively.

That is, as illustrated in FIGS. 10A to 10G, when there are three tread grooves, the control module 130 may obtain the cross-sectional width of the tire in units of pixels by adding widths of three tread grooves TH1, TH2, and TH3, two inner blocks IB1 and IB2, and two outer blocks OB1 and OB2 in units of pixels.

The above-described control module 130 may include a first module 131, a second module 132, and a third module 133.

The first module 131 may obtain the width and depth of the tread groove of the first representative frame in units of pixels, and the first representative frame is for obtaining the width and depth of the tread groove among the plurality of frames.

Specifically, the first module 131 may obtain a left edge and a right edge of a tread groove based on the number of pixels in the tire region existing in each column of the first representative frame, and obtain the number of pixels between the obtained left edge and right edge as the width of the tread groove in units of pixels.

FIGS. 5A to 5D are diagrams illustrating a process of obtaining the left edge and a right edge of the tread groove according to an exemplary embodiment of the present disclosure.

FIG. 5A is a segmented image of a second representative frame including a tire region TR and a background region BR.

FIG. 5B is a diagram illustrating G(x, h1) 521 described in Equation 2 and G(x, h2) 522 described in Equation 3 below, where an X axis represents column and a Y axis represents G(x, h1) and G(x, h2) for each column.

FIG. 5C illustrates G(x) 531 described in Equation 1, wherein an X axis represents a column and a Y axis represents G(x).

FIG. 5D is a diagram illustrating a left edge 532 and a right edge 533 in the segmented image (see FIG. 5A) of the second representative frame.

As illustrated in FIG. 5A, the first module 131 may obtain the left edge 532 and the right edge 533 of the tread groove based on the number of pixels of the tire region TR existing in each column of the first representative frame 510 according to Equations 1 to 3 below, and obtain the number of pixels between the obtained left edge 532 and right edge 533 as the width of the tread groove in units of pixels.

Specifically, the left edge 532 and the right edge 533 of the tread groove may be obtained according to Equations 1 to 3 below, respectively.

[Equation 1]

$$G(x) = G(x, h1) - G(x, h2), h1 < h2 \qquad (1)$$

-continued

[Equation 2]

$$G(x, h1) = \frac{F(x+h1) - F(x-h1)}{2 \times h1} \quad (2)$$

[Equation 3]

$$G(x, h2) = \frac{F(x+h2) - F(x-h2)}{2 \times h2} \quad (3)$$

That is, the left edge 532 and the right edge 533 of the tread groove may be a row in which G(x) obtained according to Equation (1) has a minimum value and a row in which G(x) has a maximum value, respectively.

Here, F(x+h1) may denote the number of pixels in the tire region existing in column x+h1, F(x−h1) may denote the number of pixels in the tire region existing in column x−h1, F(x+h2) may denote the number of pixels in the tire region existing in column x+h2, F(x−h2) may denote the number of pixels in the tire region existing in column x−h2, and x, h1, and h2 may denote positive natural numbers, where h1<h2.

Also, the first module 131 may obtain the upper edge and the lower edge of the tread groove based on the number of pixels of the tire region existing in each row between the left edge and the right edge of the first representative frame, and obtain the number of pixels between the obtained upper edge and lower edge as the depth of the tread groove in units of pixels.

Figure 5E:
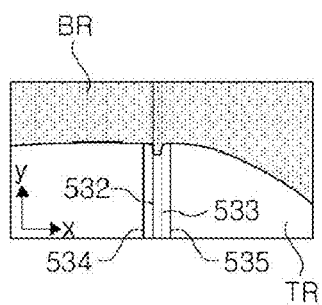
FIGS. 5E to 5G are diagrams illustrating a process of obtaining an upper edge and a lower edge of the tread groove according to the exemplary embodiment of the present disclosure.
Figure 5F:
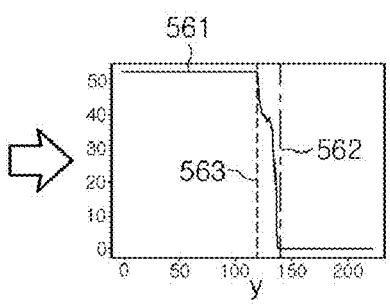
Figure 5G:
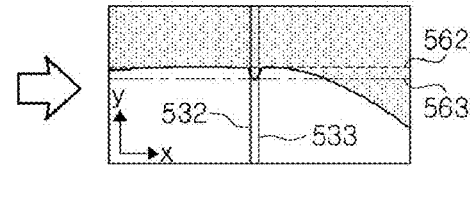

FIGS. 5E to 5G are diagrams illustrating a process of obtaining the upper edge and the lower edge of the tread groove according to the exemplary embodiment of the present disclosure.

FIG. 5E is a segmented image of the second representative frame including the left edge 532 and the right edge 533 obtained in FIG. 5A.

FIG. 5F is a diagram illustrating the number of pixels 561 of the tire region existing in each row between a first column (see 534 in FIG. 5E) in which a reference column (m) having a predetermined value is subtracted from the column indicating the left edge 532 of the tread groove and a second column (see 535 in FIG. 5E) in which the reference column (m) is added to the column 533 indicating the right edge 533 of the tread groove, where an X axis represents a row and a Y axis represents the number of pixels of the tire region for each row.

FIG. 5G is a diagram illustrating all of the left edge 532, the right edge 533, an upper edge 562, and a lower edge 563 in the segmented image (see FIG. 5E) for the second representative frame.

As illustrated in FIG. 5F, the first module 131 may obtain the lower edge 563 and the upper edge 562 of the tread groove. In detail, the first module 131 may obtain, as a lower edge 563 of the tread groove, a row in which the number of pixels in the tire region existing in each row between a first column (see 534 in FIG. 5E), in which a reference column (m) is subtracted from a column indicating the left edge of the tread groove, and a second column (see 535 in FIG. 5E), in which the reference column (m) is added to a column indicating the right edge of the tread groove starts to decrease along a direction from the tire region to a background region. Also, the first module 131 may obtain, as an upper edge 562 of the tread groove, a row in which the number of pixels in the tire region existing in each row between a first column (see 534 in FIG. 5E), in which a reference column (m) is subtracted from a column indicating the left edge of the tread groove, and a second column (see 535 in FIG. 5E), in which the reference column (m) is added to a column indicating the right edge of the tread groove is zero along a direction from the tire region to the background region. The reference column (m) has a predetermined value. Meanwhile, the first module 131 may rotate the first representative frame so that the upper end portion of the tire is horizontal, and measure the width and depth of the tread groove of the rotated first representative frame in units of pixels.

That is, as illustrated in FIGS. 6A to 6C, the first module 131 may rotate the first representative frame (see FIG. 6A) including the tread groove TH1 so that the upper end portion of the tire is horizontal (FIG. 6B).

Thereafter, as described above in FIGS. 5A to 5G, the first module 131 may obtain a width in units of pixels from a left edge 632 and a right edge 633 of the tread groove TH1 in the rotated first representative frame (see FIG. 6C), and obtain a depth of a tread groove from an upper edge 662 and a lower edge 663 of the tread groove TH1. FIGS. 6A to 6C are mainly described with respect to the first tread groove TH1, but it goes without saying that the above-described process may be equally performed for the second tread groove TH2 and the third tread groove TH3.

Next, the second module 132 may obtain the width of the inner block of the second representative frame in units of pixels, and the second representative frame is for obtaining the width of the inner block among the plurality of frames.

Specifically, the second module 132 may obtain a position of the left edge of the inner block in the second representative frame based on a moving speed of the left edge of the inner block estimated from the frames included in the first group immediately before the second group to which the second representative frame belongs.

Thereafter, the second module 132 may obtain a position of the right edge of the inner block in the second representative frame based on a moving speed of the right edge of the inner block estimated from the frames included in the first group immediately after the second group to which the second representative frame belongs.

Thereafter, the second module 132 may obtain the number of pixels between the left edge of the inner block and the right edge of the inner block as the width of the inner block in units of pixels.

Figure 7:
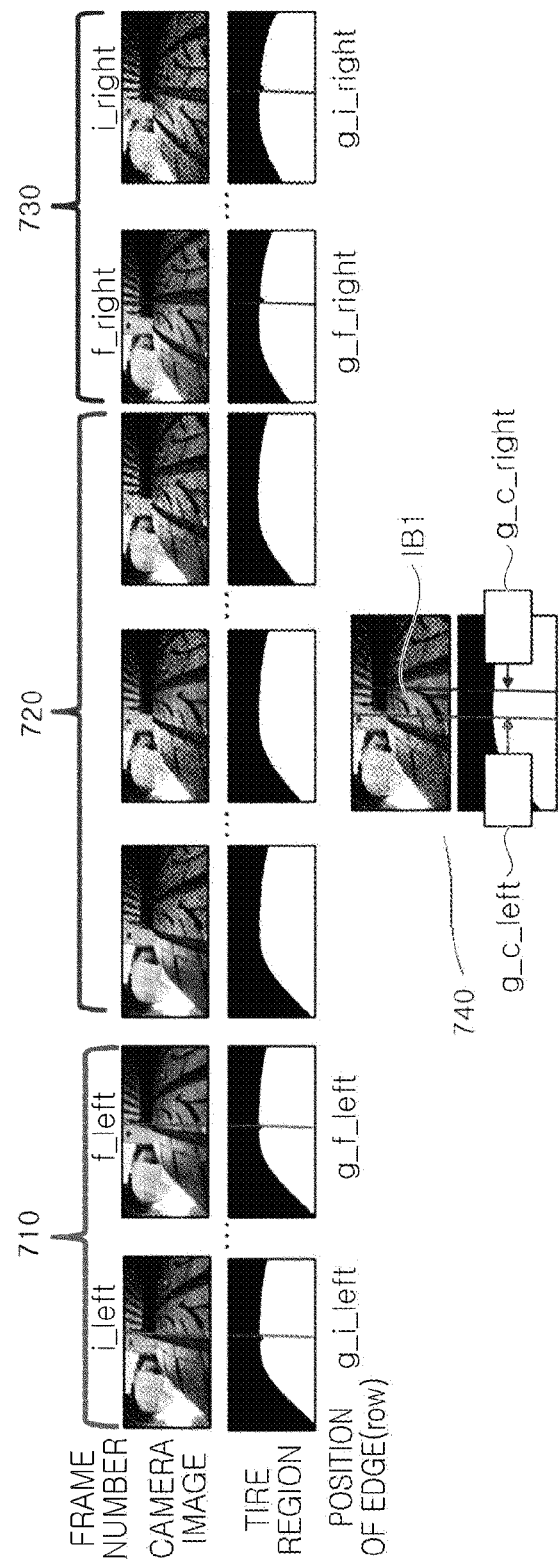
FIG. 7 is a diagram illustrating the process of obtaining the left edge and the right edge of the inner block according to the exemplary embodiment of the present disclosure.

FIG. 7 is a diagram illustrating the process of obtaining the left edge and the right edge of the inner block according to the exemplary embodiment of the present disclosure. Reference numeral 710 denotes a first group immediately before a second group 720 to which a second representative frame belongs, reference numeral 720 denotes the second group to which a second representative frame belongs, reference numeral 730 denotes the first group immediately after the second group 720 to which the second representative frame belongs, and reference numeral 740 denotes a second representative frame 740 of the second group 720.

According to the exemplary embodiment of the present disclosure, the second module 132 may estimate the moving speed of the left edge and the moving speed of the right edge using the Kalman filter.

Specifically, the second module 132 may obtain a position g_c_left of the left edge of the inner block IB1 in the second representative frame 740 according to Equation 4 below.

$$g\_c\_left = v\_f\_left \times (c - f\_left) \times 1/f \times g\_f\_left \quad \text{[Equation 4]}$$

Here, g_c_left denotes the position of the left edge of the inner block IB1 in the second representative frame 740, v_f_left denotes the moving speed of the left edge of the inner block IB1 estimated using the Kalman filter, c denotes a frame number of the second representative frame 740, f_left denotes a frame number of a last frame among the frames included in the first group 710 immediately before the second group 720 to which the second representative frame 740 belongs, f denotes a frame rate, and g_f_left denotes the position of the edge of the inner block in the last frame among the frames included in the first group 710 immediately before the second group to which the second representative frame belongs.

In particular, according to the exemplary embodiment of the present disclosure, the above-described v_f_left may be estimated using the Kalman filter based on the positions g_i_left, . . . , g_f_left of the edges of each of the frames included in the first group 710 immediately before the second group 720 to which the second representative frame 740 belongs. In this manner, by estimating the moving speed of the edge using the Kalman filter, it is possible to robustly obtain the width of the inner block in spite of noises such as the change in the capturing speed and the hand-shake that may occur during the capturing of the video.

In addition, the second module 132 may obtain the position g_c_right of the right edge of the inner block IB1 according to Equation 5 below.

$$g\_c\_right = v\_f\_right \times (c - f\_right) \times 1/f \times g\_f\_right \quad \text{[Equation 5]}$$

Here, g_c_right denotes the position of the right edge of the inner block IB1 in the second representative frame 740, v_f_right denotes the moving speed of the right edge of the inner block IB1 estimated using the Kalman filter, c denotes the frame number of the second representative frame 740, f_right denotes a frame number of a first frame among the frames included in the first group 730 immediately after the second group 720 to which the second representative frame 740 belongs, f denotes the frame rate, and g_f_right denotes the position of the edge of the inner block in the first frame among the frames included in the first group 730 immediately after the second group to which the second representative frame belongs.

In particular, according to the exemplary embodiment of the present disclosure, the above-described v_f_right may be estimated using the Kalman filter based on the positions g_i_right, . . . , g_f_right of the edges of each of the frames included in the first group 730 immediately after the second group 720 to which the second representative frame 740 belongs.

In this way, by estimating the moving speed of the edge using the Kalman filter, it is possible to robustly obtain the width of the inner block in spite of noises such as the change in the capturing speed and the hand-shake that may occur during the capturing of the video.

In addition, the third module 133 may obtain the width of the outer block of the third representative frame in units of pixels, and the third representative frame is for obtaining the width of the outer block among the plurality of frames.

Here, the outer block may include a left outer block and a right outer block.

FIGS. 8A to 8D are diagrams illustrating a process of obtaining an elbow point of an outer block according to an exemplary embodiment of the present disclosure. Hereinafter, the process for obtaining the elbow point of the outer block will be described with reference to FIGS. 8A to 8D.

Specifically, the third module 133 may detect the elbow points for the first representative frame (see FIGS. 8A and 8C) of the 1$^{st}$ second group and the first representative frame (see FIGS. 8B and 8D) of the last second group, respectively. Here, the elbow point may be a point at which the boundary of the outer block OB1 of the tire is bent.

Figure 8A:
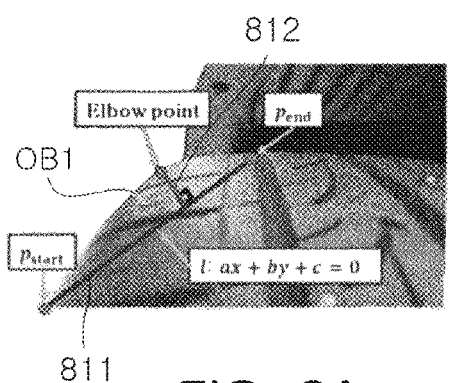
FIGS. 8A to 8D are diagrams illustrating a process of obtaining an elbow point of an outer block according to an exemplary embodiment of the present disclosure.

Specifically, as illustrated in FIG. 8A, the elbow point of the first representative frame of the 1$^{st}$ second group may be a point at which a straight line 812 having the longest length among straight lines perpendicular to a straight line (1: ax+by+c=0) connecting between a first point ($p_{end}$) where the left edge of the tread groove in the first representative frame of the 1$^{st}$ second group intersects the upper end portion of the tire region and a second point ($p_{start}$) that intersects the outer boundary of the tire region from the first point ($p_{end}$) intersects the outer boundary of the tire region.

Figure 8B:
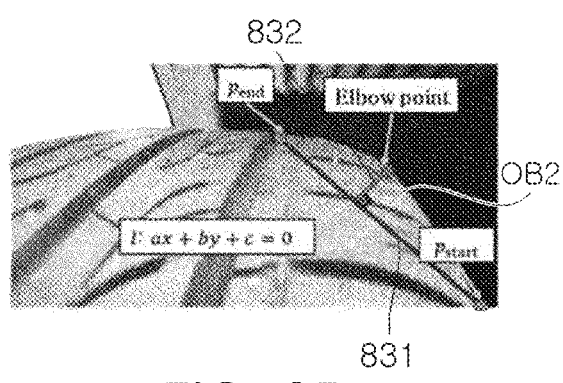

Similarly, as illustrated in FIG. 8B, the elbow point of the first representative frame of the last second group may be a point at which a straight line 832 having the longest length among straight lines perpendicular to a straight line (1: ax+by+c=0) connecting between a third point ($p_{end}$) where the right edge of the tread groove in the first representative frame of the last second group intersects the upper end portion of the tire region and a fourth point ($p_{start}$) that intersects the outer boundary of the tire region from the third point ($p_{end}$) intersects the outer boundary of the tire region.

Figure 8C:
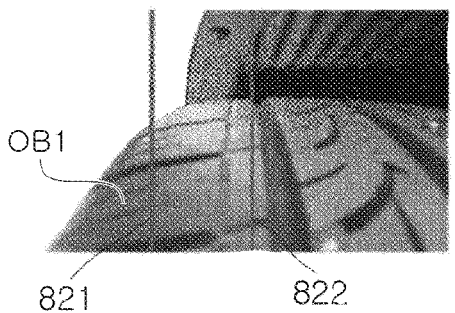

Then, as illustrated in FIG. 8C, the third module 133 may obtain a number of pixels between the detected elbow point in the first representative frame of the 1$^{st}$ second group and the edge (i.e., the number of pixels between 821 and 822) of the tread groove in the first representative frame of the 1$^{st}$ second group, as the width of the left outer block OB1 in units of pixels.

Figure 8D:
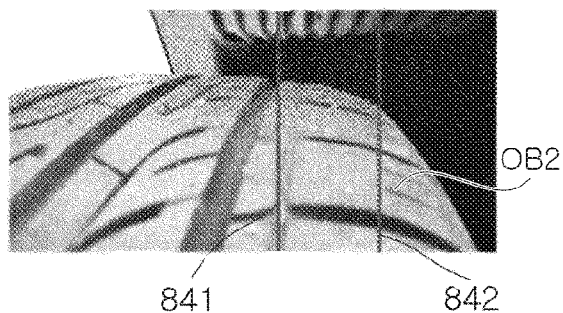

Similarly, as illustrated in FIG. 8D, the third module 133 may obtain a number of pixels between the detected elbow point in the first representative frame of the last second group and the edge (i.e., the number of pixels between 841 and 842) of the tread groove in the first representative frame of the last second group, as the width of the right outer block OB2 in units of pixels.

Finally, the conversion module 140 may convert the depth of the tread groove in units of pixels into the depth in physical units according to Equation 6 below based on the ratio of the cross-sectional width of the tire in units of pixels and the cross-sectional width of the tire in physical units.

[Equation 6]

$$D\_TH\_PH = \frac{D\_TIRE\_PH}{D\_TIRE\_PIXEL} \times D\_TH\_PIXEL$$

Here, D_TH_PH may denote the depth (unit: mm) of the tread groove in physical units, D_TIRE_PH may denote the cross-sectional width (unit: mm) of the tire in physical units, D_TIRE_PIXEL may denote the depth (unit: pixel) of the tread groove in units of pixels.

Figure 9:
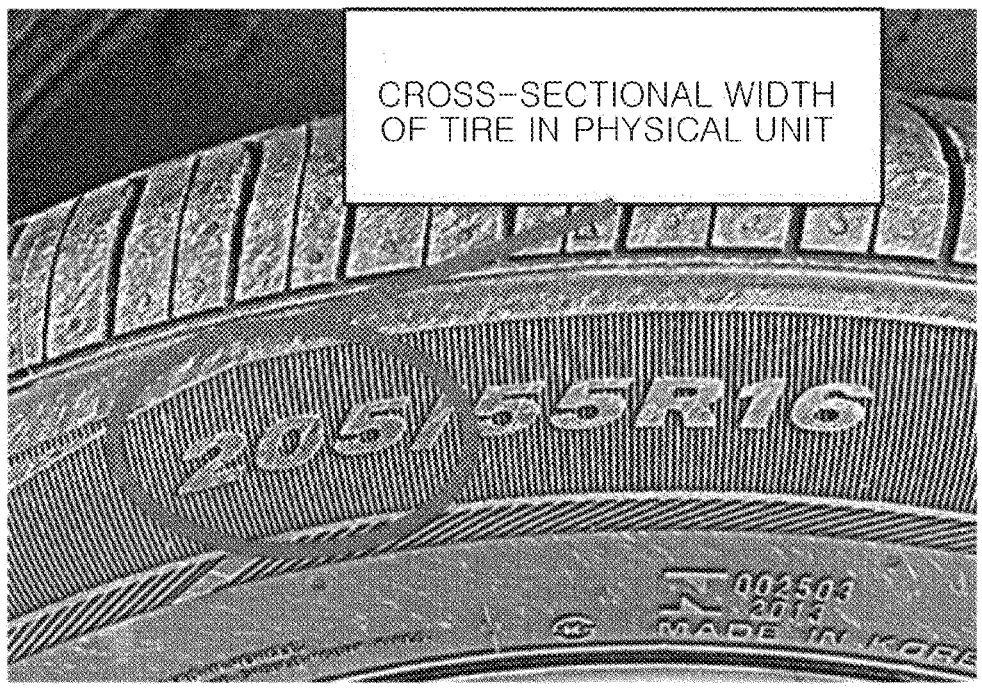
FIG. 9 is a diagram illustrating a cross-sectional width of a tire in physical units marked on a sidewall of the tire.
Figure 10:
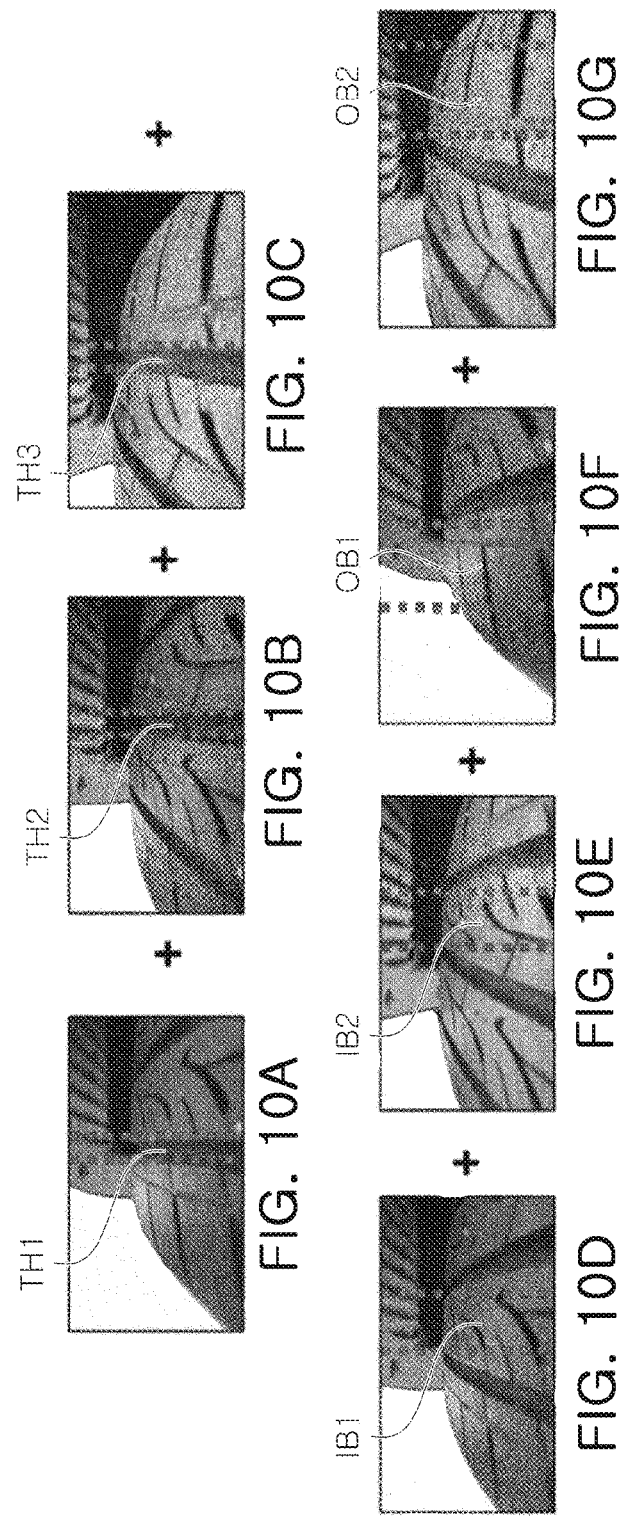
FIGS. 10A to 10G are diagrams illustrating widths of each tread groove, TH1, TH2, and TH3, the inner block, IB1 and IB2, and the outer block, OB1 and OB2, of the tire in units of pixels, respectively.

As illustrated in FIG. 9, the cross-sectional width of the tire in physical units may be a value marked on a side wall of the tire.

The input/output module 150 may be a module that receives or outputs various pieces of data from a user.

For example, the input/output module 150 may receive the cross-sectional width of the tire in physical units illustrated in FIG. 9, which will be described later, from a user, or output a tire replacement alarm when a depth of any one of a plurality of tread grooves in units of pixels is less than a preset threshold value.

Figure 11:
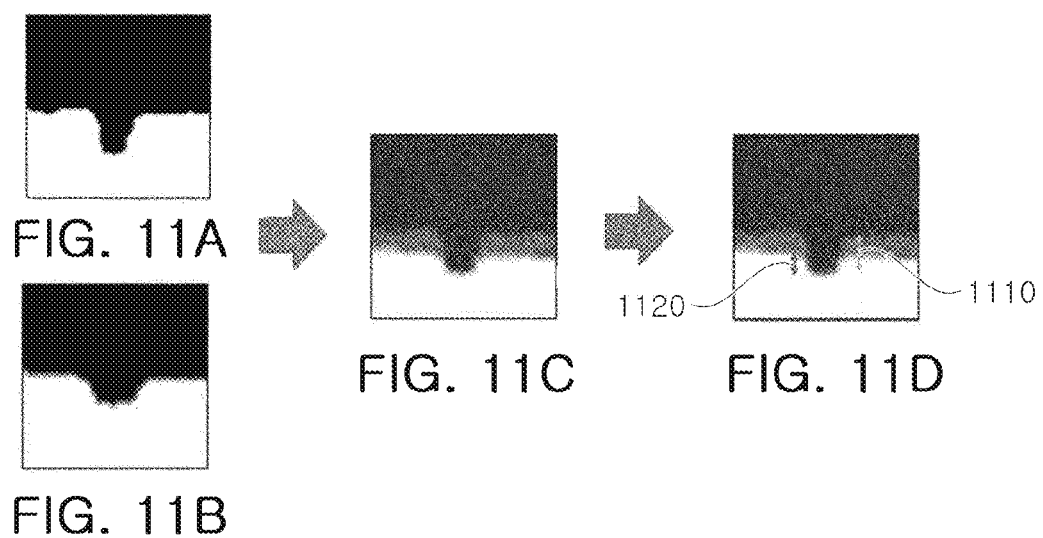
FIGS. 11A to 11D are diagrams in which a segmented image of a first representative frame of a new tire and a segmented image of a first representative frame of a worn tire are superimposed and displayed according to an exemplary embodiment of the present disclosure.

Alternatively, according to the exemplary embodiment of the present disclosure, as illustrated in FIGS. 11A-11D, the input/output module 150 may superimpose and display a segmented image (see FIG. 11A) of a first representative frame of a new tire and the segmented image (see FIG. 11B)

of the first representative frame of the worn tire (see FIG. 11C). In this case, a depth 1110 of the tread groove of the new tire and a depth 1120 of the tread groove of the worn tire may be compared and displayed (see FIG. 11D).

The input/output module 150 may include, for example, a keyboard, a mouse, a touch panel, a display panel, and the like.

Meanwhile, the storage module 160 may store a video including a plurality of frames captured by the above-described camera module 110 and a segmented image for each of the plurality of frames.

In the present disclosure, the apparatus 100 for measuring a tread groove may include, for example, portable terminals such as a smartphone, a mobile phone, a notebook computer, a digital broadcasting terminal, personal digital assistants (PDA), a portable multimedia player (PMP), and a tablet PC. However, according to the exemplary embodiment of the present disclosure, the portable terminal includes only the camera module 110, the input/output module 150, and the storage module 160, and it goes without saying that a separate external server may be configured to include the segmentation module 120, the control module 130, and the conversion module 140.

As described above, according to the exemplary embodiment of the present disclosure, it is possible to simply measure the depth of the tread groove without the separate measuring device and to robustly measure the depth of the inner block in spite of the noises such as the change in the capturing speed, hand-shake, and the like that may occur during the capturing of the video.

Figure 12:
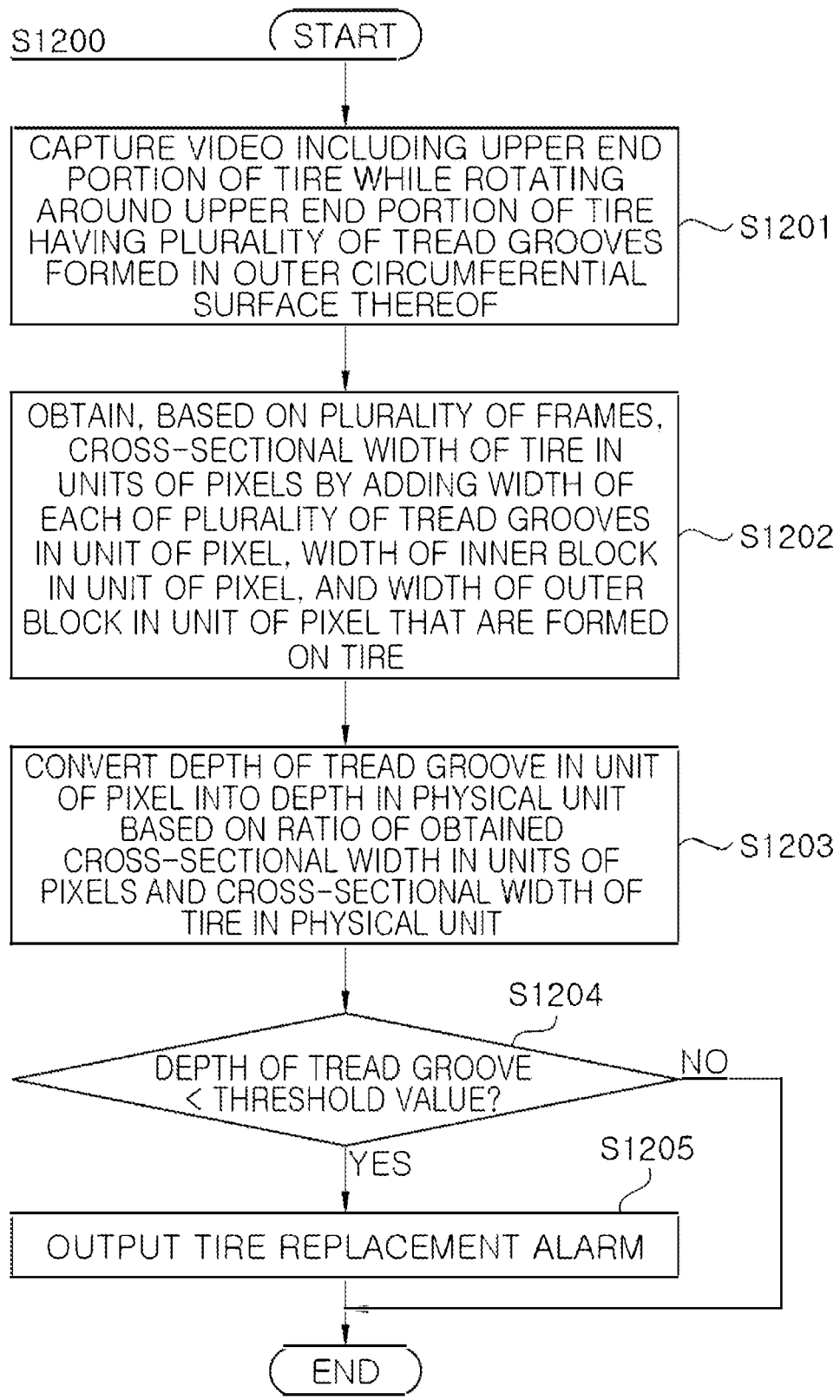
FIG. 12 is a flowchart illustrating a method of measuring a depth of a tread groove according to an exemplary embodiment of the present disclosure.
Figure 13:
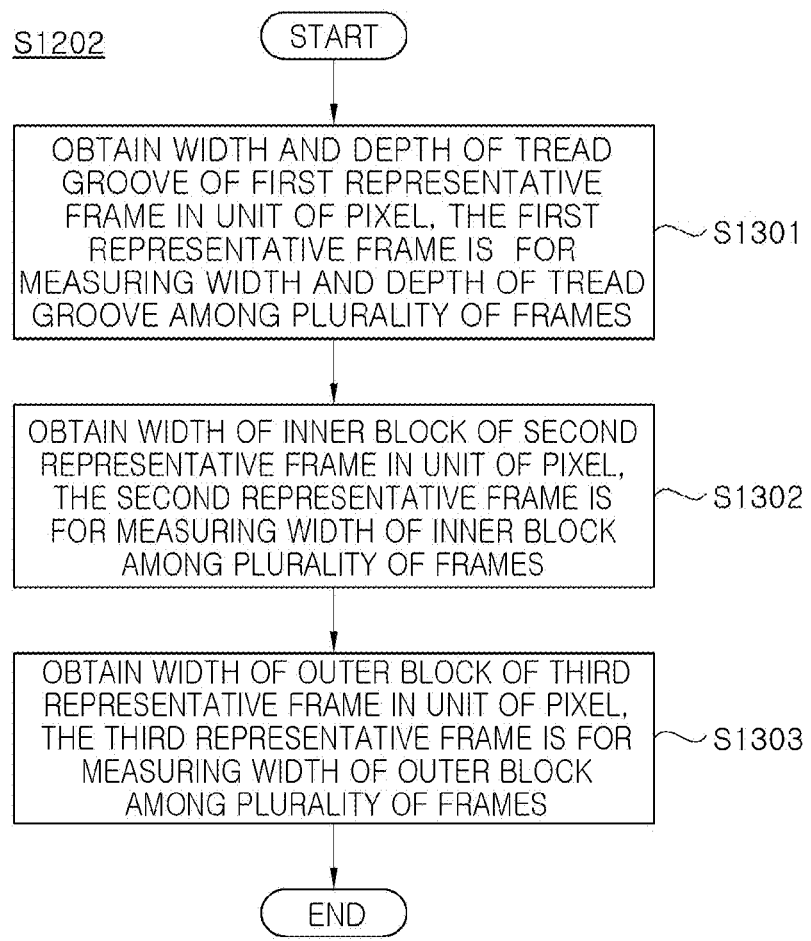
FIG. 13 is a flowchart illustrating step S1202 of FIG. 12.

FIG. 12 is a flowchart illustrating a method of measuring a depth of a tread groove according to an exemplary embodiment of the present disclosure. FIG. 13 is a flowchart illustrating step S1202 of FIG. 12.

Hereinafter, a method (S1200) of measuring a depth of a tread groove according to an exemplary embodiment of the present disclosure will be described with reference to FIGS. 1 to 13. However, for simplification of the disclosure, a description overlapping with FIG. 1 to FIGS. 11A to 11D will be omitted.

Referring to FIGS. 1 to 13, first, the method (S1200) of measuring a depth of a tread groove according to an exemplary embodiment of the present disclosure may start from a step of capturing, the camera module 110, a video of a region including the upper end portion of the tire while rotating around the upper end portion of the tire having the plurality of tread grooves formed in the outer circumferential surface thereof (S1201).

The above-described video may include a plurality of frames. It has been already described that the plurality of frames described above alternately includes a first group including frames in which a tread groove having a depth of a tread groove less than a preset threshold value is not visible and a second group including frames in which a tread groove having a groove depth of a tread equal to or greater than the preset threshold value is visible.

Here, the first representative frame is a frame having the largest width of the tread groove among the frames included in the second group, and the number of the first representative frame is equal to the number of the plurality of tread grooves.

The second representative frame is one of the frames included in the first group between two adjacent second groups, and it has been already described that the third representative frame may comprises the first representative frame among the frames included in the 1$^{st}$ second group and the first representative frame among the frames included in the last second group.

Meanwhile, the control module 130 may obtain, based on a plurality of frames, a cross-sectional width of the tire in units of pixels by adding the widths of each of the plurality of tread grooves in units of pixels, the width of the inner block in units of pixels, and the width of the outer block in units of pixels that are formed on the tire (S1202). Here, it has been already described that the inner block may mean the tire region between two tread grooves in the frame, and the outer block may mean the tire region including the tread groove only on one side of the frame.

Meanwhile, FIG. 13 is a flowchart illustrating step S1202 of FIG. 12.

Referring to FIG. 13, the first module 131 may obtain the width and depth of the tread groove of the first representative frame in units of pixels, and the first representative frame is for obtaining the width and depth of the tread groove among the plurality of frames (S1301).

Specifically, it has been already described that the first module 131 may obtain, based on Equations 1 to 3 described above, the left edge and the right edge of the tread groove based on the number of pixels in the tire region existing in each column of the first frame, and obtain the number of pixels between the obtained left edge and right edge as the width of the tread groove in units of pixels.

Also, it has been already described that the first module 131 may obtain the upper edge and the lower edge of the tread groove based on the number of pixels of the tire region existing in each row between the left edge and the right edge of the first frame, and obtain the number of pixels between the obtained upper edge and lower edge as the depth of the tread groove in units of pixels.

Here, the lower edge of the tread groove is a row in which the number of pixels in the tire region existing in each row between a first column, in which a reference column is subtracted from a column indicating the left edge of the tread groove, and a second column, in which the reference column is added to a column indicating the right edge of the tread groove starts to decrease along a direction from the tire region to a background region, and upper edge of the tread groove is a row in which the number of pixels in the tire region existing in each row between a first column, in which a reference column is subtracted from a column indicating the left edge of the tread groove, and a second column, in which the reference column is added to a column indicating the right edge of the tread groove is zero along a direction from the tire region to the background region.

In addition, it has been already described that the first module 131 may rotate the first representative frame so that the upper end portion of the tire is horizontal, and measure the width and depth of the tread groove of the rotated first representative frame in units of pixels.

Next, the second module 132 may obtain the width of the inner block of the second representative frame in units of pixels, and the second representative frame is for obtaining the width of the inner block among the plurality of frames (S1302).

Specifically, the second module 132 may obtain the position of the left edge of the inner block in the second representative frame based on the moving speed of the left edge of the inner block estimated from the frames included in the first group immediately before the second group to which the second representative frame belongs.

Thereafter, the second module 132 may obtain the position of the right edge of the inner block within the second representative frame based on the moving speed of the right edge of the inner block estimated from the frames included in the first group immediately after the second group to which the second representative frame belongs.

Thereafter, the second module 132 may obtain the number of pixels between the left edge of the inner block and the right edge of the inner block as the width of the inner block in units of pixels.

Here, the moving speed of the left edge and the moving speed of the right edge may be estimated using the Kalman filter.

In addition, the third module 133 may obtain the width of the outer block of the third representative frame in units of pixels, and the third representative frame is for obtaining the width of the outer block among the plurality of frames (S1303). Here, it has been already described that the outer block may include a left outer block and a right outer block.

In detail, the third module 133 may detect, for each of the first representative frame of the $1^{st}$ second group and the first representative frame of the last second group, the elbow point, in which the elbow point is a point at which the boundary of the outer block of the tire is bent. In addition, it has been already described that the third module 133 may obtain the detected elbow point in the first representative frame of the $1^{st}$ second group and the number of pixels between the detected edges of the tread groove in the first representative frame of the $1^{st}$ second group as the width of the left outer block in units of pixels, and the detected elbow point in the first representative frame of the last second group and the number of pixels between the detected edge of the tread groove in the first representative frame of the last second group as the width of the right outer block in units of pixels.

Here, the elbow point of the first representative frame of the $1^{st}$ second group may be the point at which the straight line having the longest length among the straight lines perpendicular to the straight line connecting between a first point at which the detected left edge of the tread groove in the first representative frame of the $1^{st}$ second group intersects the upper end portion of the tire region and the second point intersecting the outer boundary of the tire region from the first point intersects the outer boundary of the tire region.

In addition, it has been already described that the elbow point of the first representative frame of the last second group may be the point at which the straight line having the longest length among the straight lines perpendicular to the straight line connecting between the third point at which the detected right edge of the tread groove in the first representative frame of the last second group intersects the upper end portion of the tire region and the fourth point intersecting the outer boundary of the tire region from the third point intersects the outer boundary of the tire region.

Referring back to FIG. 12, the conversion module 140 may convert the depth of the tread groove in units of pixels into the depth in physical units according to Equation 6 described above based on the ratio of the cross-sectional width of the tire in units of pixels and the cross-sectional width of the tire in physical units (S1203).

Thereafter, the conversion module 140 may determine whether the depth of the tread groove in physical units is less than a preset threshold value (S1204).

As a result of the determination, when the depth of the tread groove in the physical units is less than the preset threshold value, the input/output module 150 may output the tire replacement alarm.

In addition, according to the exemplary embodiment of the present disclosure, it has been already described that the input/output module 150 may superimpose and display the segmented image of the first representative frame of the new tire and the segmented image of the first representative frame of the worn tire.

As described above, according to the exemplary embodiment of the present disclosure, it is possible to simply measure the depth of the tread groove without the separate measuring device and to robustly measure the depth of the inner block in spite of the noises such as the change in the capturing speed, the hand-shake, and the like that may occur during the capturing of the video.

Figure 14:
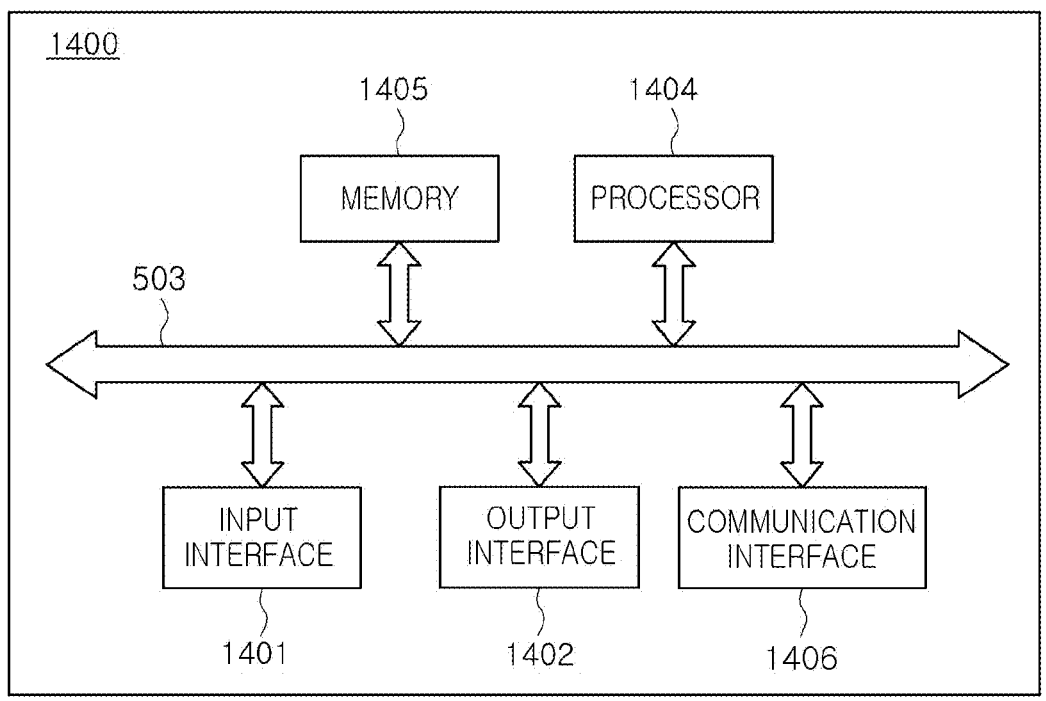
FIG. 14 is a block diagram of a computer device that may entirely or partially implement an apparatus for measuring a depth of a tread groove according to an exemplary embodiment of the present disclosure.

Meanwhile, FIG. 14 is a block diagram of a computer device that may entirely or partially implement the apparatus for measuring a depth of a tread groove according to the exemplary embodiment of the present disclosure, and the present disclosure may be applied to the apparatus 100 for measuring a tread groove illustrated in FIG. 1.

As illustrated in FIG. 14, a computer device 1400 includes an input interface 1401, an output interface 1402, a processor 1404, a memory 1405 and a communication interface 1406, and the input interface 1401, the output interface 1402, the processor 1404, the memory 1405, and the communication interface 1406 may be interconnected via a system bus 1403.

In the exemplary embodiment of the present disclosure, the memory 1405 is used to store programs, instructions, or codes, and the processor 1404 may execute the programs, instructions, or codes stored in the memory 1405 and control the input interface 1401 to receive a signal and control the output interface 1402 to transmit a signal. The memory 1405 described above may include read-only memory and random access memory, and may provide instructions and data to the processor 1404.

In the exemplary embodiment of the present disclosure, the processor 1404 may be a central processing unit (CPU), and should be understood as being other general-purpose processors, a digital signal processor (DSP), an application specific integrated circuit (ASIC), a field programmable gate array (FPGA) or other programmable logic devices, a discrete gate or a transistor logic device, a discrete hardware component, or the like. The general purpose processor may be a microprocessor, or the processor may be any conventional processor or the like.

In one implementation process, the method performed in FIGS. 12 and 13 may be achieved by an integrated logic circuit of hardware in the processor 1404 or an instruction in the form of software. The content of the method disclosed in relation to the exemplary embodiment of the present disclosure may be implemented to be performed and completed by a hardware processor, or may be performed and completed by a combination of hardware and software modules of the processor. The software module may be disposed in a storage medium such as random access memory, flash memory, read-only memory, programmable read-only memory, electrically erasable programmable memory, or a register. The corresponding storage medium is located in the memory 1405, and the processor 1404 reads information from the memory 1405 and implements the contents of the above-described method in combination with hardware. In order to avoid duplication, detailed descriptions will be omitted herein.

In addition, in describing the present disclosure, "~ module" may be implemented by various methods, for example, a processor, program instructions executed by the processor, a software module, a microcode, computer program products, a logic circuit, an application-specific integrated circuit, firmware, and the like.

According to an exemplary embodiment of the present disclosure, it is possible to simply measure a depth of a tread groove without a separate measuring device and to robustly measure a depth of an inner block in spite of noises such as a change in a capturing speed, hand-shake, and the like that may occur during capturing of a video.

While exemplary embodiments have been shown and described above, it will be apparent to those skilled in the art that modifications and variations could be made without departing from the scope of the present invention as defined by the appended claims.

What is claimed is:

1. An apparatus for measuring a depth of a tread groove, comprising:
   a processor; and
   a memory with instructions stored thereon, wherein the instructions, when executed by the processor, enable the apparatus to:
      capture a video including an upper end portion of a tire while rotating around the upper end portion of the tire having a plurality of tread grooves disposed in an outer circumferential surface of the tire, the video including a plurality of frames;
      obtain, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and
      convert the depth of the tread groove in units of pixels into the depth in physical units based on a ratio of the cross-sectional width of the tire in units of pixels and the cross-sectional width of the tire in the physical units.

2. The apparatus of claim 1, wherein the instructions, when executed by the processor, further enable the apparatus to:
   obtain a width and a depth of a tread groove in a first representative frame among the plurality of frames in units of pixels;
   obtain a width of an inner block in a second representative frame among the plurality of frames in units of pixels; and
   obtain a width of an outer block in a third representative frame among the plurality of frames in units of pixels.

3. The apparatus of claim 2, wherein the plurality of frames alternately includes:
   a first group including frames in which a tread groove having a depth less than a preset threshold value is not visible, and
   a second group including frames in which a tread groove having a depth equal to or greater than the preset threshold value is visible,
   the first representative frame is a frame having the largest width of the tread groove among the frames included in the second group, and the number of the first representative frame is equal to the number of the plurality of tread grooves,
   the second representative frame is one of the frames included in the first group between two adjacent second groups, and
   the third representative frame comprises the first representative frame among frames included in a first second group and the first representative frame among frames included in a last second group.

4. The apparatus of claim 3, wherein the outer block includes a left outer block and a right outer block, and
   the instructions, when executed by the processor, further enable the apparatus to:
      detect, for each of the first representative frame of the first second group and the first representative frame of the last second group, an elbow point, the elbow point being a point at which a boundary of the outer block of the tire is bent,
      obtain a number of pixels between the detected elbow point in the first representative frame of the first second group and an edge of the tread groove in the first representative frame of the first second group, as a width of the left outer block in units of pixels, and
      obtain a number of pixels between the detected elbow point in the first representative frame of the last second group and an edge of the tread groove in the first representative frame of the last second group, as a width of the right outer block in units of pixels.

5. The apparatus of claim 4, wherein the detected elbow point of the first representative frame of the first second group is a point at which straight line having a longest length among straight lines perpendicular to a straight line connecting between a first point at which the detected left edge of the tread groove in the first representative frame of the first second group intersects the upper end portion of the tire region and a second point intersecting an outer boundary of the tire region from the first point intersects the outer boundary of the tire region, and
   the detected elbow point of the first representative frame of the last second group is a point at which straight line having a longest length among straight lines perpendicular to a straight line connecting between a third point at which the detected right edge of the tread groove in the first representative frame of the last second group intersects the upper end portion of the tire region and a fourth point intersecting an outer boundary of the tire region from the third point intersects the outer boundary of the tire region.

6. The apparatus of claim 2, wherein the instructions, when executed by the processor, further enable the apparatus to:
   rotate the first representative frame so that the upper end portion of the tire is horizontal, and
   obtain width and depth in units of pixel for the rotated tread groove in the first representative frame.

7. The apparatus of claim 2, wherein the instructions, when executed by the processor, further enable the apparatus to:
   obtain a left edge and a right edge of the tread groove based on a number of pixels of the tire region existing in each column of the first representative frame, and determines a number of pixels between the left edge and the right edge as the width of the tread groove in units of pixels, and
   obtain an upper edge and a lower edge of the tread groove based on the number of pixels of the tire region existing in each row between the left edge and the right edge of the first representative frame, and determines the number of pixels between the upper edge and the lower edge as the depth of the tread groove in units of pixels.

8. The apparatus of claim 7, wherein the left edge and the right edge of the tread groove, respectively, are obtained by the following Equations:

$$G(x) = G(x, h1) - G(x, h2), h1 < h2 \quad (1)$$

$$G(x, h1) = \frac{F(x+h1) - F(x-h1)}{2 \times h1} \quad (2)$$

$$G(x, h2) = \frac{F(x+h2) - F(x-h2)}{2 \times h2} \quad (3)$$

where G(x) denotes a column having a minimum value and a maximum value, F(x+h1) denotes the number of pixels in a tire region existing in column x+h1, F(x−h1) denotes the number of pixels in a tire region existing in column x−h1, F(x+h2) denotes the number of pixels in a tire region existing in column x+h2, F(x−h2) denote the number of pixels in a tire region in column x−h2, and x, h1, and h2 denote positive natural numbers.

9. The apparatus of claim 7, wherein the lower edge of the tread groove is a row in which the number of pixels in the tire region existing in each row between a first column, in which a reference column is subtracted from a column indicating the left edge of the tread groove, and a second column, in which the reference column is added to a column indicating the right edge of the tread groove starts to decrease along a direction from the tire region to a background region, and the upper edge of the tread groove is a row in which the number of pixels in the tire region existing in each row between a first column, in which a reference column is subtracted from a column indicating the left edge of the tread groove, and a second column, in which the reference column is added to a column indicating the right edge of the tread groove is zero along a direction from the tire region to the background region.

10. The apparatus of claim 2, wherein the instructions, when executed by the processor, further enable the apparatus to:
obtain a position of the left edge of the inner block in the second representative frame based on a moving speed of the left edge of the inner block estimated from frames included in a first group immediately before a second group to which the second representative frame belongs,
obtain a position of the right edge of the inner block in the second representative frame based on a moving speed of the right edge of the inner block estimated from frames included in the first group immediately after the second group to which the second representative frame belongs, and
obtain the number of pixels between the left edge of the inner block and the right edge of the inner block as the width of the inner block in units of pixels.

11. The apparatus of claim 10, wherein the moving speed of the left edge and the moving speed of the right edge are estimated using a Kalman filter.

12. The apparatus of claim 11, wherein the position of the left edge of the inner block is obtained by the following Equation:

$$g\_c\_left = v\_f\_left \times (c - f\_left) \times 1/f \times g\_f\_left$$

where g_c_left denotes the position of the left edge of the inner block in the second representative frame, v_f_left denotes the moving speed of the left edge of the inner block estimated using the Kalman filter, c denotes a frame number of the second representative frame, f_left denotes a frame number of a last frame among the frames included in the first group immediately before the second group to which the second representative frame belongs, f denotes a frame rate, and g_f_left denotes a position of the edge of the inner block in the last frame among the frames included in the first group immediately before the second group to which the second representative frame belongs, and
the position of the right edge of the inner block is obtained by the following Equation:

$$g\_c\_right = v\_f\_right \times (c - f\_right) \times 1/f \times g\_f\_right$$

where g_c_right denotes the position of the right edge of the inner block in the second representative frame, v_f_right denotes the moving speed of the right edge of the inner block estimated using the Kalman filter, c denotes a frame number of the second representative frame, f_right denotes a frame number of a first frame among the frames included in the first group immediately after the second group to which the second representative frame belongs, f denotes a frame rate, and g_f_right denotes a position of the edge of the inner block in the first frame among the frames included in the first group immediately after the second group to which the second representative frame belongs.

13. The apparatus of claim 1, wherein the instructions, when executed by the processor, further enable the apparatus to output a tire replacement alarm when a depth of any one of the plurality of tread grooves in physical units is less than a preset threshold value.

14. The apparatus of claim 13, wherein the instructions, when executed by the processor, further enable the apparatus to superimposes and displays a segmented image of the first representative frame of a new tire and a segmented image of the first representative frame of a worn tire.

15. The apparatus of claim 1, wherein the instructions, when executed by the processor, further enable the apparatus to convert the depth of the tread groove in units of pixels into the depth in physical units according to the Equation below:

$$D\_TH\_PH = \frac{D\_TIRE\_PH}{D\_TIRE\_PIXEL} \times D\_TH\_PIXEL$$

where D_TH_PH denotes the depth of the tread groove in physical units, D_TIRE_PH denotes the cross-sectional width of the tire in physical units, D_TIRE_PIXEL denotes the cross-sectional width of the tire in units of pixels, and D_TH_PIXEL denotes the depth of the tread groove in units of pixels.

16. A method of measuring a depth of a tread groove, comprising:
capturing a video including an upper end portion of a tire while rotating around the upper end portion of the tire having a plurality of tread grooves disposed in an outer circumferential surface of the tire, the video including a plurality of frames;
obtaining based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and
converting the depth of the tread groove in units of pixels into the depth in physical units based on a ratio of the cross-sectional width of the tire in units of pixels and the cross-sectional width of the tire in the physical units.

17. The method of claim 16, wherein the method further comprising:
obtaining a width and a depth of a tread groove of a first representative frame among the plurality of frames in units of pixels;
obtaining a width of an inner block of a second representative frame among the plurality of frames in units of pixels; and
obtaining a width of an outer block of a third representative frame among the plurality of frames in units of pixels.

18. The method of claim 17, wherein the plurality of frames alternately includes:
a first group including frames in which a tread groove having a depth less than a preset threshold value is not visible and
a second group including frames in which a tread groove having a depth equal to or greater than the preset threshold value is visible,
the first representative frame is a frame having the largest width of the tread groove among the frames included in the second group, and the number of the first representative frame is equal to the number of the plurality of tread grooves,
the second representative frame is one of the frames included in the first group between two adjacent second groups, and
the third representative frame comprises the first representative frame among frames included in a first second group and the first representative frame among frames included in a last second group.

19. The method of claim 17, wherein the method further comprising rotating the first representative frame so that the upper end portion of the tire is horizontal and obtaining a width and a depth of a tread groove of the rotated first representative frame in units of pixels.

20. A non-transitory computer-readable storage medium having a program comprising instructions that cause a computer to:
capture a video including an upper end portion of a tire while rotating around the upper end portion of the tire having a plurality of tread grooves disposed in an outer circumferential surface of the tire, the video including a plurality of frames;
obtain, based on the plurality of frames, a cross-sectional width of the tire in units of pixels by adding widths of each of the plurality of tread grooves in units of pixels, a width of an inner block in units of pixels, and a width of an outer block in units of pixels, the inner and outer blocks are disposed on the tire, the inner block being a tire region between two tread grooves in the frame and the outer block being a tire region including a tread groove on only one side of the frame; and
convert the depth of the tread groove in units of pixels into the depth in physical units based on a ratio of the cross-sectional width of the tire in units of pixels and the cross-sectional width of the tire in the physical units.

* * * * *